(12) United States Patent
Naruse et al.

(10) Patent No.: US 9,851,530 B2
(45) Date of Patent: Dec. 26, 2017

(54) IMAGING LENS AND IMAGING APPARATUS

(71) Applicant: FUJIFILM Corporation, Tokyo (JP)

(72) Inventors: Yousuke Naruse, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/272,617

(22) Filed: Sep. 22, 2016

(65) Prior Publication Data

US 2017/0090151 A1    Mar. 30, 2017

(30) Foreign Application Priority Data

Sep. 28, 2015  (JP) .................................. 2015-189267

(51) Int. Cl.
| | |
|---|---|
| *G02B 9/00* | (2006.01) |
| *G02B 9/12* | (2006.01) |
| *G02B 9/64* | (2006.01) |
| *G02B 27/00* | (2006.01) |

(52) U.S. Cl.
CPC ........... *G02B 9/64* (2013.01); *G02B 27/0025* (2013.01)

(58) Field of Classification Search
CPC .... G02B 7/04; G02B 13/009; G02B 13/0045; G02B 13/006; G02B 15/14; G02B 15/167; G02B 15/22; G02B 15/20; G02B 21/025; G03B 5/00; G03B 13/18; G03B 13/36
USPC .................................. 359/676–706, 822–826
See application file for complete search history.

(56) References Cited

FOREIGN PATENT DOCUMENTS

| | | |
|---|---|---|
| JP | S61-188512 A | 8/1986 |
| JP | 5418884 B2 | 2/2014 |

*Primary Examiner* — Mahidere Sahle
(74) *Attorney, Agent, or Firm* — Studebaker & Brackett PC

(57) ABSTRACT

An imaging lens includes, in order from the object side, a first lens group fixed during focusing, a positive second lens group moved toward the object side during focusing from a distant to a close object, and a third lens group fixed during focusing and including one positive lens. The second group includes, in order from the object side, a first cemented lens including a biconvex lens and a negative lens having a smaller absolute value of curvature radius of the object-side surface than of the image-side surface, and a second cemented lens having a positive refractive power and including a negative lens having a smaller absolute value of curvature radius of the image-side surface than of the object-side surface and a positive lens having a smaller absolute value of curvature radius of the object-side surface than of the image-side surface. The imaging lens satisfies specific condition expressions.

18 Claims, 13 Drawing Sheets

EXAMPLE 1

INFINITY

200mm

EXAMPLE 2

INFINITY

200mm

EXAMPLE 3

INFINITY

200mm

EXAMPLE 4

INFINITY

200mm

EXAMPLE 5

EXAMPLE 6

IMAGING LENS AND IMAGING APPARATUS

CROSS-REFERENCE TO RELATED APPLICATIONS

The present application claims priority under 35 U.S.C. §119 to Japanese Patent Application No. 2015-189267, filed on Sep. 28, 2015. The above application is hereby expressly incorporated by reference, in its entirety, into the present application.

BACKGROUND

The present disclosure relates to an imaging lens and an imaging apparatus, and, in particular, to a single focus imaging lens that is suitable for applications such as FA (factory automation), machine vision, monitoring cameras, replaceable lenses, etc., and an imaging apparatus provided with the imaging lens.

A conventionally well-known configuration of single focus imaging lenses is of a retrofocus type where a lens group having a negative refractive power is disposed on the object side and a lens group having a positive refractive power is disposed on the image side. For example, Japanese Unexamined Patent Publication No. S61 (1986)-188512 (hereinafter, Patent Document 1) teaches a retrofocus lens system where a lens group having a negative refractive power is disposed on the object side of the stop, and a lens group having a positive refractive power is disposed on the image side of the stop. Further, Japanese Patent No. 5418884 (hereinafter, Patent Document 2) teaches a retrofocus lens system where two negative lenses are successively disposed from the most object side, and a lens group having a positive refractive power is disposed on the image side.

SUMMARY

In recent years, machine vision is often used, which images an object with an imaging lens and performs automatic detection, measurement, etc., of the object. The object to be imaged may have various shapes and may be at various distances from the imaging lens, and it is desired that the imaging lens used have a focusing function with a wide focusing range. In addition, accuracy is required in detection or measurement, and it is also desired that the imaging lens have small changes of aberrations along with focusing. On the other hand, in the case of FA or machine vision, there often are constraints in installation of the imaging apparatus, and it is preferred for a monitoring camera that the most object-side lens be not moved during focusing. For these reasons, it is desired that an imaging lens used for these applications have the entire length of the lens that does not change during focusing.

Although Patent Documents 1 and 2 describe the focusing operation, the lens systems of Patent Documents 1 and 2 are not deemed to have a sufficiently wide focusing range. Further, suppression of changes of spherical aberration and astigmatism along with focusing of the lens systems of Patent Documents 1 and 2 is not sufficient.

In view of the above-described circumstances, the present disclosure is directed to providing an imaging lens that can achieve focusing without changing the entire length, has a wide focusing range, has suppressed changes of aberrations along with focusing, and has good optical performance, as well as an imaging apparatus provided with the imaging lens.

An aspect of the imaging lens of the disclosure consists of, in order from the object side, a first lens group that is fixed relative to an image plane during focusing, a second lens group that is moved as a whole from the image side toward the object side during focusing from a distant object to a close object and as a whole has a positive refractive power, and a third lens group that is fixed relative to the image plane during focusing, wherein the second lens group consists of, in order from the object side, a first cemented lens consisting of, in order from the object side, a biconvex lens and a negative lens having a smaller absolute value of radius of curvature of the object-side surface than that of the image-side surface, and a second cemented lens as a whole having a positive refractive power and consisting of, in order from the object side, a negative lens having a smaller absolute value of radius of curvature of the image-side surface than that of the object-side surface and a positive lens having a smaller absolute value of radius of curvature of the object-side surface than that of the image-side surface, the third lens group consists of one positive lens, a stop that is fixed relative to the image plane during focusing is disposed at a position between the most object-side lens surface of the first lens group and the most object-side lens surface of the second lens group, and all the condition expressions (1) to (5) below are satisfied:

$$N21 < N22 \quad (1),$$

$$\nu 22 < \nu 21 \quad (2),$$

$$N24 < N23 \quad (3),$$

$$\nu 23 < \nu 24 \quad (4), \text{ and}$$

$$0.2 < D/f < 0.8 \quad (5),$$

where N21 is a refractive index with respect to the d-line of the biconvex lens of the first cemented lens, N22 is a refractive index with respect to the d-line of the negative lens of the first cemented lens, N23 is a refractive index with respect to the d-line of the negative lens of the second cemented lens, N24 is a refractive index with respect to the d-line of the positive lens of the second cemented lens, ν21 is an Abbe number with respect to the d-line of the biconvex lens of the first cemented lens, ν22 is an Abbe number with respect to the d-line of the negative lens of the first cemented lens, ν23 is an Abbe number with respect to the d-line of the negative lens of the second cemented lens, ν24 is an Abbe number with respect to the d-line of the positive lens of the second cemented lens, D is an equivalent air distance along the optical axis between the first cemented lens and the second cemented lens, and f is a focal length of the entire system when the imaging lens is focused on an object at infinity.

In the imaging lens of the disclosure, it is preferred that the first cemented lens as a whole have a positive refractive power.

In the imaging lens of the disclosure, it is preferred that the first lens group as a whole have a positive refractive power.

In the imaging lens of the disclosure, it is preferred that any one of or any combination of the condition expressions (6) to (12) and (5-1) to (8-1) below be satisfied:

$$0 < f/f1 < 0.6 \quad (6),$$

$$0.4 < f/f2 < 0.8 \quad (7),$$

$0 < \beta 2 < 0.6$ (8), $0.25 < N22 - N21 < 0.6$ (9), $25 < \nu 21 - \nu 22 < 70$ (10), $0.2 < N23 - N24 < 0.7$ (11), $40 < \nu 24 - \nu 23 < 75$ (12), $0.25 < D/f < 0.7$ (5-1), $0.12 < f/f1 < 0.5$ (6-1), $0.45 < f/f2 < 0.7$ (7-1), and $0.15 < \beta 2 < 0.5$ (8-1), where f is a focal length of the entire system when the imaging lens is focused on an object at infinity, f1 is a focal length of the first lens group, f2 is a focal length of the second lens group, β2 is a lateral magnification of the second lens group when the imaging lens is focused on an object at infinity, N21 is a refractive index with respect to the d-line of the biconvex lens of the first cemented lens, N22 is a refractive index with respect to the d-line of the negative lens of the first cemented lens, N23 is a refractive index with respect to the d-line of the negative lens of the second cemented lens, N24 is a refractive index with respect to the d-line of the positive lens of the second cemented lens, ν21 is an Abbe number with respect to the d-line of the biconvex lens of the first cemented lens, ν22 is an Abbe number with respect to the d-line of the negative lens of the first cemented lens, ν23 is an Abbe number with respect to the d-line of the negative lens of the second cemented lens, ν24 is an Abbe number with respect to the d-line of the positive lens of the second cemented lens, and D is an equivalent air distance along the optical axis between the first cemented lens and the second cemented lens.

In the imaging lens of the disclosure, it is preferred that the first lens group include, successively in order from the most object side, a single lens having a positive refractive power and a single lens having a negative refractive power.

In the imaging lens of the disclosure, it is preferred that the first lens group include, successively in order from the most image side, a positive lens, a positive lens, and a negative lens.

In the imaging lens of the disclosure, it is preferred that the first lens group consist of seven lenses.

The imaging apparatus of the disclosure comprises the imaging lens of the disclosure.

It should be noted that the above description "the imaging lens of the disclosure consists of" means "consists essentially of" and that the imaging lens of the disclosure may include, besides the elements recited above, lenses substantially without any power; optical elements other than lenses, such as a stop, a cover glass, and filters; and mechanical components, such as a lens flange, a lens barrel, a camera shake correction mechanism, etc. The same applies to the above descriptions "the second lens group consists of . . . ", "the third lens group consists of . . . ", and "the first lens group consists of . . . ".

It should be noted that, with respect to any lens or lens group including an aspheric surface of the imaging lens of the disclosure, the sign (positive or negative) of the refractive power of the lens group, the sign of the refractive power of the lens, and the surface shape of the lens are about the paraxial region. The "single lens" as used herein refers to one lens that is not a cemented lens. The values defining the above condition expressions are with respect to the d-line (the wavelength of 587.6 nm) used as the reference wavelength. It should be noted that the "lens group" as used herein is not limited to a lens group that consists of a plurality of lenses, and also encompasses a lens group that consists only of one lens.

It should be noted that the sign with respect to the lateral magnification is defined as follows. Assuming a vertical cross section including a horizontal optical axis, and that the object height of an object above the optical axis has a positive value, the object height of an object below the optical axis has a negative value, the image height of an image above the optical axis has a positive value, and the image height of an image below the optical axis has a negative value, then, if the object height and the image height are of the same sign, the lateral magnification has a positive value, and if the object height and the image height are of different signs, the lateral magnification has a negative value.

The lens system according to the disclosure consists of, in order from the object side, a first lens group that is fixed during focusing, a positive second lens group that is moved toward the object side during focusing from a distant object to a close object, and a third lens group that is fixed during focusing, wherein the configurations of the second lens group and third lens group are set in detail, a stop that is fixed during focusing is disposed within a preferred range, and the lens system is configured to satisfy the specific condition expressions. This allows providing an imaging lens that can achieve focusing without changing the entire length, has a wide focusing range, has suppressed changes of aberrations along with focusing, and has good optical performance, as well as an imaging apparatus provided with the imaging lens.

DETAILED DESCRIPTION OF THE PREFERRED EMBODIMENTS

Figure 1:
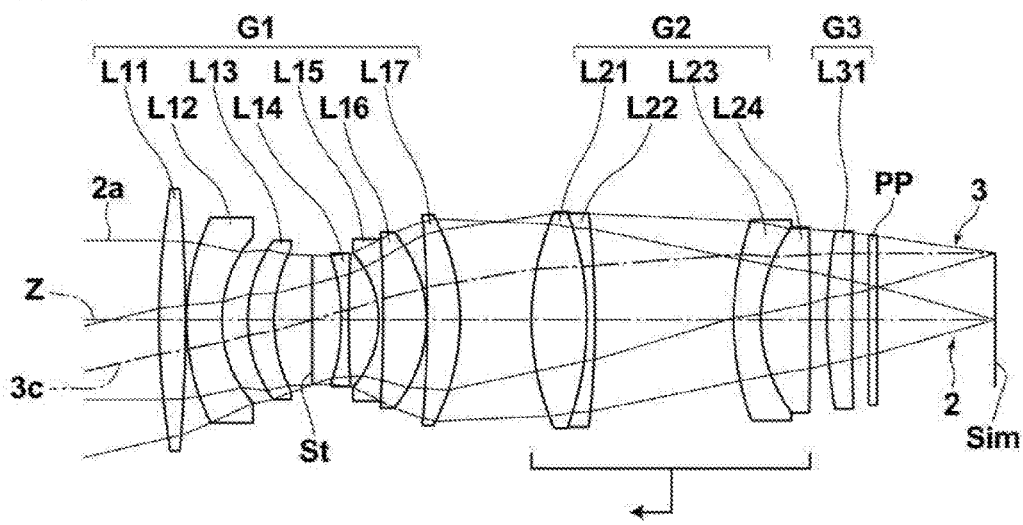
FIG. 1 is a sectional view illustrating the configuration of and optical paths through an imaging lens of Example 1 of the disclosure.
Figure 1:
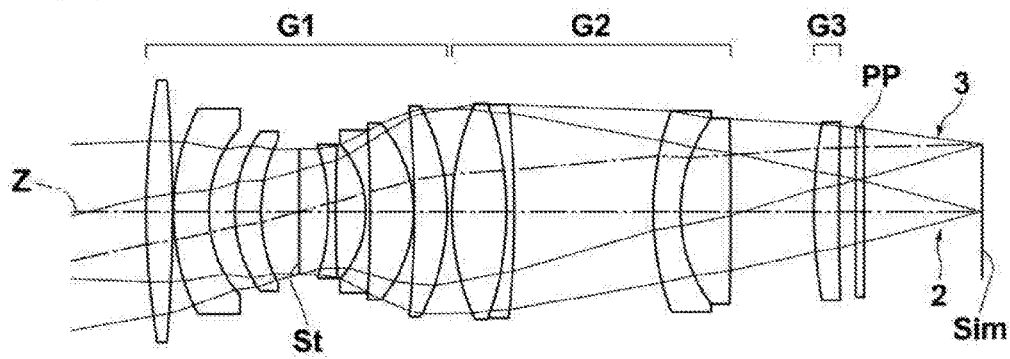

Hereinafter, embodiments of the disclosure will be described in detail with reference to the drawings. FIGS. 1 to 6 are sectional views illustrating the configurations of and optical paths through imaging lenses according to an embodiment of the disclosure, which correspond to Examples 1 to 6, which will be described later, respectively. The examples shown in FIGS. 1 to 6 have the same basic configuration and are shown in the drawings in the same manner, and therefore the following description is made mainly with reference to the example shown in FIG. 1. In FIG. 1, the left side is the object side and the right side is the image side, and the optical paths shown are of an axial bundle of rays 2 and an off-axis bundle of rays 3 at the maximum angle of view.

This imaging lens is a single focus lens, and consists essentially of, in order from the object side toward the image side along the optical axis Z, a first lens group G1 that is fixed relative to the image plane Sim during focusing, a second lens group G2 that is moved relative to the image plane Sim during focusing, and a third lens group G3 that is fixed relative to the image plane Sim during focusing. That is, this imaging lens employs an inner focus system where the second lens group G2 is a focus group. In FIG. 1, a state where the imaging lens is focused on an object at infinity is shown at the top with the text "INFINITY", and a state where the imaging lens is focused on a close object at an object distance of 200 mm is shown at the bottom with the text "200 mm". The "object distance" as used herein refers to a distance along the optical axis Z from the most object-side lens surface to the object.

It should be noted that, in the example shown in FIG. 1, an optical member PP in the form of a plane-parallel plate is disposed between the most image-side lens and the image plane Sim. However, the position of the optical member PP may be different from the position in the example shown in FIG. 1, or a configuration where the optical member PP is omitted is also possible. The optical member PP is assumed to represent various filters, such as an infrared cut-off filter and a low-pass filter, a cover glass, etc.

Further, in this imaging lens, an aperture stop St that is fixed relative to the image plane Sim during focusing is disposed at a position between the most object-side lens surface of the first lens group G1 and the most object-side lens surface of the second lens group G2. This allows reducing changes of F-number along with focusing. It should be noted that the aperture stop St shown in FIG. 1 does not necessarily represent the size and the shape thereof, but represents the position thereof along the optical axis Z.

The configuration where the first lens group G1 is not moved during focusing facilitates avoiding interference between the imaging lens during the focusing operation and other structures. For example, in the case where this imaging lens is applied to a dome-shaped monitoring camera, it is easier to achieve a configuration where the imaging lens does not interfere with the dome during the focusing operation.

The second lens group G2 is configured to be moved as a whole from the image side toward the object side during focusing from an object at infinity to a close object. The arrow shown below the second lens group G2 shown at the top of FIG. 1 indicates the direction of movement of the second lens group G2 during focusing. It should be noted that the description "the second lens group G2 is moved as a whole" means that all the elements of the second lens group G2 are moved at the same time in the same direction by the same amount.

Now, the configuration of the second lens group G2 is described in detail. The second lens group G2 as a whole is a lens group having a positive refractive power, and this allows reducing the incidence angle of principal rays at the peripheral angle of view onto the image plane Sim.

The second lens group G2 consists essentially of, in order from the object side, a first cemented lens and a second cemented lens. The first cemented lens consists of, in order from the object side, a lens L21, which is a biconvex lens, and a lens L22, which is a negative lens having a smaller absolute value of radius of curvature of the object-side surface than that of the image-side surface. The second cemented lens consists of, in order from the object side, a lens L23, which is a negative lens having a smaller absolute value of radius of curvature of the image-side surface than that of the object-side surface, and a lens L24, which is a positive lens having a smaller absolute value of radius of curvature of the object-side surface than that of the image-side surface, and the second cemented lens as a whole has a positive refractive power.

The second lens group G2 is configured to satisfy all the condition expressions (1) to (5) below:

$$N21 < N22 \quad (1),$$

$$v22 < v21 \quad (2),$$

$$N24 < N23 \quad (3),$$

$$v23 < v24 \quad (4), \text{ and}$$

$$0.2 < D/f < 0.8 \quad (5),$$

where N21 is a refractive index with respect to the d-line of the biconvex lens of the first cemented lens, N22 is a refractive index with respect to the d-line of the negative lens of the first cemented lens, v21 is an Abbe number with respect to the d-line of the biconvex lens of the first cemented lens, v22 is an Abbe number with respect to the d-line of the negative lens of the first cemented lens, N23 is a refractive index with respect to the d-line of the negative lens of the second cemented lens, N24 is a refractive index with respect to the d-line of the positive lens of the second cemented lens, v23 is an Abbe number with respect to the d-line of the negative lens of the second cemented lens, v24 is an Abbe number with respect to the d-line of the positive lens of the second cemented lens, D is an equivalent air distance along the optical axis between the first cemented lens and the second cemented lens, and f is a focal length of the entire system when the imaging lens is focused on an object at infinity.

The lenses L21 and L22 having the above-described shapes and the above-described refractive powers and satisfying the condition expression (1) allow successful correction of spherical aberration. The lenses L21 and L22 having the above-described shapes and the above-described refractive powers and satisfying the condition expressions (1) and (5) allow highly uniform control of spherical aberration across the entire focusing range. The lenses L21 and L22 satisfying the condition expression (2) allow successful correction of longitudinal chromatic aberration. The lenses L21 and L22 satisfying the condition expressions (2) and (5) allow highly uniform control of longitudinal chromatic aberration across the entire focusing range.

The lenses L23 and L24 having the above-described shapes and the above-described refractive powers and satisfying the condition expression (3) provide a high height of the axial marginal rays 2a incident on the cemented surface of the second cemented lens during focusing from a distant object to a close object, thereby allowing enhancing the effect of spherical aberration correction. It should be noted that, unlike the imaging lens of this embodiment, a lens system where the entire lens system is moved during focusing tends to have undercorrected spherical aberration in the state where the lens system is focused on a close object. In contrast, the imaging lens of this embodiment employing the inner focus system with the lenses L23 and L24 having the above-described shapes and the above-described refractive powers and satisfying the condition expression (3) allows reducing changes of spherical aberration along with focusing when compared to the lens system where the entire lens system is moved during focusing. Further, the lenses L23 and L24 satisfying the condition expression (4) allow reducing changes of longitudinal chromatic aberration along with focusing.

Keeping the distance between the first cemented lens and the second cemented lens above the lower limit of the condition expression (5) allows ensuring a sufficient distance between the first cemented lens and the second cemented lens, and this allows achieving aberration correction by utilizing changes of the height of the axial marginal rays 2a and the height of the off-axis principal rays, such as the principal rays 3c at the maximum angle of view, at the cemented surface of the first cemented lens and the cemented surface of the second cemented lens along with focusing. For example, aberration correction can effectively be achieved by assigning the first cemented lens and the second cemented lens with different roles, such that, in the case where the changes of the height of the axial marginal rays 2a at the cemented surface of the first cemented lens are small and the changes of the height of the axial marginal rays 2a at the cemented surface of the second cemented lens are large during focusing, the first cemented lens effects the overall spherical aberration correction regardless of the object distance, and the second cemented lens suppresses changes of spherical aberration along with focusing.

Further, keeping the distance between the first cemented lens and the second cemented lens above the lower limit of the condition expression (5) facilitates utilizing different actions of the two cemented surfaces on spherical aberration and astigmatism that occur along with focusing. This allows making the sign (positive or negative) of differences of changes of longitudinal spherical aberration and astigmatism along with focusing the same, thereby facilitating making the best image plane position along the optical axis direction for the center of the imaging area be coincident with or close to the best image plane position along the optical axis direction for the periphery of the imaging area across the entire focusing range.

Keeping the distance between the first cemented lens and the second cemented lens below the upper limit of the condition expression (5) allows keeping the entire length of the lens short. In order to enhance the effects with respect to the condition expression (5), it is more preferable that the condition expression (5-1) below be satisfied:

$$0.25 < D/f < 0.7 \quad (5\text{-}1).$$

The second lens group G2 having the above-described direction of movement during focusing and the above-described lens configuration allows suppressing changes of aberrations, in particular, spherical aberration and field curvature, along with focusing, and this facilitates achieving an imaging lens having a wide focusing range.

It is preferred that the second lens group G2 further satisfy any one of or any combination of the condition expressions (7) to (12) below:

$$0.4 < f/f2 < 0.8 \quad (7),$$

$$0 < \beta 2 < 0.6 \quad (8),$$

$$0.25 < N22 - N21 < 0.6 \quad (9),$$

$$25 < \nu 21 - \nu 22 < 70 \quad (10),$$

$$0.2 < N23 - N24 < 0.7 \quad (11), \text{ and}$$

$$40 < \nu 24 - \nu 23 < 75 \quad (12),$$

where f is a focal length of the entire system when the imaging lens is focused on an object at infinity, f2 is a focal length of the second lens group, $\beta 2$ is a lateral magnification of the second lens group when the imaging lens is focused on an object at infinity, N21 is a refractive index with respect to the d-line of the biconvex lens of the first cemented lens, N22 is a refractive index with respect to the d-line of the negative lens of the first cemented lens, N23 is a refractive index with respect to the d-line of the negative lens of the second cemented lens, N24 is a refractive index with respect to the d-line of the positive lens of the second cemented lens, $\nu 21$ is an Abbe number with respect to the d-line of the biconvex lens of the first cemented lens, $\nu 22$ is an Abbe number with respect to the d-line of the negative lens of the first cemented lens, $\nu 23$ is an Abbe number with respect to the d-line of the negative lens of the second cemented lens, and $\nu 24$ is an Abbe number with respect to the d-line of the positive lens of the second cemented lens.

Keeping the value of f/f2 above the lower limit of the condition expression (7) allows reducing the amount of movement of the second lens group G2 during focusing. Keeping the value of f/f2 below the upper limit of the condition expression (7) allows suppressing changes of distortion along with focusing.

Keeping the value of $\beta 2$ above the lower limit of the condition expression (8) allows reducing the amount of movement of the second lens group G2 during focusing. It should be noted that, when the value of $\beta 2$ is around $-1$, the amount of movement of the second lens group G2 during focusing is largely increased, and focusing cannot be achieved when the value of $\beta 2$ is $-1$. Keeping the value of $\beta 2$ below the upper limit of the condition expression (8) allows suppressing changes of spherical aberration and longitudinal chromatic aberration along with focusing.

Keeping the value of N22−N21 above the lower limit of the condition expression (9) is advantageous for successfully correcting spherical aberration. Keeping the value of N22−

N21 below the upper limit of the condition expression (9) allows keeping an appropriate positive refractive power of the second lens group G2 and reducing the amount of movement of the second lens group G2 during focusing.

Keeping the value of ν21−ν22 above the lower limit of the condition expression (10) is advantageous for successfully correcting longitudinal chromatic aberration. Keeping the value of ν21−ν22 below the upper limit of the condition expression (10) facilitates preventing overcorrection of longitudinal chromatic aberration.

Keeping the value of N23−N24 above the lower limit of the condition expression (11) allows suppressing changes of spherical aberration along with focusing. Keeping the value of N23−N24 below the upper limit of the condition expression (11) allows appropriately keeping the positive refractive power of the second lens group G2 and reducing the amount of movement of the second lens group G2 during focusing.

Keeping the value of ν24−ν23 above the lower limit of the condition expression (12) allows suppressing changes of longitudinal chromatic aberration along with focusing. Keeping the value of ν24−ν23 below the upper limit of the condition expression (12) facilitates preventing overcorrection of longitudinal chromatic aberration.

In order to enhance the effects with respect to the condition expressions (7) to (12), respectively, it is more preferable that the condition expressions (7-1) to (12-1) below within the ranges of the condition expressions (7) to (12), respectively, be satisfied:

$$0.45 < f/f2 < 0.7 \quad (7\text{-}1),$$

$$0.15 < \beta2 < 0.5 \quad (8\text{-}1),$$

$$0.27 < N22 - N21 < 0.5 \quad (9\text{-}1),$$

$$30 < \nu21 - \nu22 < 65 \quad (10\text{-}1),$$

$$0.25 < N23 - N24 < 0.6 \quad (11\text{-}1),$$

$$47 < \nu24 - \nu23 < 70 \quad (12\text{-}1),$$

It should be noted that the first cemented lens as a whole may have a positive refractive power or a negative refractive power. If the first cemented lens as a whole has a positive refractive power, the first cemented lens and the second cemented lens can share the role of providing a positive refractive power, thereby suppressing spherical aberration.

Next, the third lens group G3 is described. The third lens group G3 is not moved during focusing, as a whole has a positive refractive power, and consists essentially of one positive lens. As described above, while changes of aberrations along with focusing can be suppressed by optimizing the radius of curvatures, the surface distances, and the materials of the lenses of the second lens group G2, it is difficult to completely eliminate residual aberrations when the number of lenses forming the imaging lens is limited. Disposing the third lens group G3 having a positive refractive power at the most image-side position as a lens grope that is not moved allows adjusting residual longitudinal chromatic aberration and field curvature with the third lens group G3 when changes of aberrations along with focusing are suppressed with the second lens group G2. In other words, the third lens group G3 allows enhancing the effects of suppressing changes of longitudinal chromatic aberration and field curvature along with focusing. Further, the third lens group G3 being a positive lens group allows suppressing the incidence angle of off-axis principal rays onto the image plane Sim. Further, the third lens group G3 consisting of one single lens is advantageous for size reduction of the imaging lens.

Next, a preferred configuration of the first lens group G1 is described. It is preferred that the first lens group G1 as a whole have a positive refractive power, and this allows suppressing changes of spherical aberration and longitudinal chromatic aberration along with focusing.

It is preferred that the first lens group G1 satisfy the condition expression (6) below:

$$0 < f/f1 < 0.6 \quad (6),$$

where f is a focal length of the entire system when the imaging lens is focused on an object at infinity, and f1 is a focal length of the first lens group.

Keeping the value of f/f1 above the lower limit of the condition expression (6) allows suppressing changes of spherical aberration and longitudinal chromatic aberration along with focusing. Keeping the value of f/f1 below the upper limit of the condition expression (6) allows reducing the amount of movement of the second lens group G2 during focusing. In order to enhance the effects with respect to the condition expression (6), it is more preferable that the condition expression (6-1) below be satisfied:

$$0.12 < f/f1 < 0.5 \quad (6\text{-}1).$$

It is preferred that the first lens group G1 include, successively in order from the most object side, a single lens having a positive refractive power and a single lens having a negative refractive power. In this case, the single lens having a positive refractive power at the most object-side position allows keeping the entire length of the lens short and correcting distortion. Further, the single lens having a negative refractive power allows correcting longitudinal chromatic aberration and spherical aberration and facilitates ensuring a sufficient back focus.

It is preferred that the first lens group G1 include, successively in order from the most image side, a positive lens, a positive lens, and a negative lens. In this case, the two positive lenses, i.e., the first and second lenses from the image side of the first lens group G1 can share the role of providing a positive refractive power, and this allows suppressing spherical aberration. The negative lens, i.e., the third lens from the image side of the first lens group G1 allows correcting spherical aberration and chromatic aberration.

It is preferred that the most image-side lens of the first lens group G1 have a convex surface toward the image side. In this case, the lens surface of the first lens group G1 nearest to the second lens group G2 and the second lens group G2 can share the role of providing a positive refractive power, and this allows suppressing spherical aberration.

The first lens group G1 may consist essentially of seven lenses, for example. The first lens group G1 having a seven-lens configuration allows achieving both the size reduction of the lens system and the suppression of changes of aberrations along with focusing.

Now, a possible configurations of the first lens group G1 is described in detail with respect to the example shown in FIG. 1. The first lens group G1 shown in FIG. 1 consists essentially of seven lenses, i.e., lenses L11 to L17 in this order from the object side. The lens L11 is a biconvex lens, and this lens allows keeping the entire length small and correcting distortion. The lens L12 is a negative lens having a concave surface toward the image side, and this lens allows correcting longitudinal chromatic aberration and spherical aberration, and facilitates ensuring a sufficient back focus. The lens L13 is a positive meniscus lens with the convex surface toward the object side, and this lens allows correcting spherical aberration overcorrected at the lens L12 while suppressing astigmatism. The lens L14 is a biconcave lens, and this lens allows correcting longitudinal chromatic aberration and spherical aberration, and facilitates ensuring a sufficient back focus. The lens L15 is a negative lens having a smaller absolute value of radius of curvature of the object-side surface than that of the image side-surface, and this lens allows correcting longitudinal chromatic aberration and spherical aberration, and facilitates ensuring a sufficient back focus. Further, the lenses L14 and L15 having the above-described shapes allow reducing the refracting angle of the axial marginal rays 2a at each lens surface by sharing the role of providing a negative refractive power, to thereby suppress high-order spherical aberration. The lens L16 and the lens L17 are positive lenses having a smaller absolute value of radius of curvature of the image-side surface than that of the object-side surface. The lenses L16 and L17 contribute to ensuring a sufficient positive refractive power of the first lens group G1, and allow suppressing spherical aberration by sharing the role of providing a positive refractive power.

The above-described preferred configurations and possible configurations, including the configurations relating to the condition expressions, can be used in any combination, and they are preferably selected as appropriate depending on the required specifications. According to the embodiment of the disclosure, an imaging lens that can achieve focusing without changing the entire length, has a wide focusing range from infinity to a close distance, has suppressed changes of aberrations along with focusing, and has good optical performance can be accomplished. It should be noted that the description "has a wide focusing range" as used herein means that the closest object distance at which the imaging lens can focus is ten times the focal length of the entire system or smaller.

Next, numerical examples of the imaging lens of the disclosure are described.

Example 1

The lens configuration of the imaging lens of Example 1 is as shown in FIG. 1. The configuration and the manner of description in the drawing are as described above, and the same description may not be repeated. The imaging lens of Example 1 consists of, in order from the object side, a first lens group G1 having a positive refractive power, a second lens group G2 having a positive refractive power, and a third lens group G3 having a positive refractive power. The focus group is formed only by the second lens group G2, and the second lens group G2 is moved as a whole from the image side toward the object side during focusing from an object at infinity to a close object. It should be noted that imaging lenses of Examples 2 to 6, which will be described later, also have a three-group configuration, have the same sign (positive or negative) of the refractive power of each lens group as described above, and achieve focusing in the same manner as described above.

In the imaging lens of Example 1, the first lens group G1 consists of seven lenses, i.e., lenses L11 to L17 in this order from the object side, the second lens group G2 consists of four lenses, i.e., lenses L21 to L24 in this order from the object side, and the third lens group G3 consists of one lens, i.e., a lens L31. An aperture stop St is disposed between the lens L13 and the lens L14.

Table 1 shows basic lens data of the imaging lens of Example 1, and Table 2 shows specifications and variable surface distances of the imaging lens. In Table 1, each value in the column of "Si" represents the surface number of the i-th (where i=1, 2, 3, . . . ) surface, where the object-side surface of the most object-side element is the 1st surface and the number is sequentially incremented toward the image side, each value in the column of "Ri" represents the radius of curvature of the i-th surface, each value in the column of "Di" represents the surface distance between the i-th surface and the i+1-th surface along the optical axis Z, each value in the column of "Ndj" represents the refractive index with respect to the d-line (the wavelength of 587.6 nm) of the j-th (where j=1, 2, 3, . . . ) element, where the most object-side element is the 1st element and the number is sequentially incremented toward the image side, and each value in the column of "vdj" represents the Abbe number with respect to the d-line of the j-th element.

The sign with respect to the radius of curvature is provided such that a positive radius of curvature indicates a surface shape that is convex toward the object side, and a negative radius of curvature indicates a surface shape that is convex toward the image side. Table 1 also shows the aperture stop St and the optical member PP. In Table 1, the surface number and the text "(St)" are shown at the position in the column of surface number corresponding to the aperture stop St. The value at the bottom of the column of "Di" represents the distance between the most image-side surface and the image plane Sim.

Further, in Table 1, each variable surface distance that is changed during focusing is represented by the symbol "DD[ ]", where the surface number of the object-side surface corresponding to the variable surface distance is shown within the "[ ]." Table 2 shows values of focal length f' of the entire system, F-number FNo., maximum full angle of view 2ω, and variable surface distances, which values are with respect to the d-line. The symbol "(°)" shown next to "2ω" means that the unit is "degrees". In Table 2, values in a state where the imaging lens is focused on an object at infinity are shown in the column denoted by "Infinity", and values in a state where the imaging lens is focused on an object at an object distance of 200 mm are shown in the column denoted by "200 mm".

With respect to the data shown in each table, the unit of angle is degrees, and the unit of length is millimeters; however, any other suitable units may be used since optical systems are usable when they are proportionally enlarged or reduced. It should be noted that the numerical values shown in the tables below are rounded at predetermined decimal places.

TABLE 1

Example 1

| Si | Ri | Di | Ndj | vdj |
|---|---|---|---|---|
| 1 | 96.55758 | 3.152 | 1.72916 | 54.68 |
| 2 | −192.45325 | 0.100 | | |
| 3 | 28.23376 | 4.308 | 1.80518 | 25.42 |
| 4 | 15.68154 | 3.142 | | |
| 5 | 16.94140 | 3.148 | 1.91999 | 19.00 |
| 6 | 19.78374 | 4.588 | | |
| 7(St) | ∞ | 3.509 | | |
| 8 | −25.31788 | 0.888 | 1.71247 | 29.38 |
| 9 | 200.57373 | 3.610 | | |
| 10 | −12.47483 | 0.519 | 1.87547 | 21.23 |
| 11 | −190.84226 | 5.205 | 1.74062 | 53.94 |
| 12 | −16.77576 | 0.100 | | |

TABLE 1-continued

Example 1

| Si | Ri | Di | Ndj | vdj |
|---|---|---|---|---|
| 13 | −133.79642 | 3.930 | 2.00272 | 19.32 |
| 14 | −27.59366 | DD[14] | | |
| 15 | 33.22955 | 6.644 | 1.49700 | 81.61 |
| 16 | −38.33609 | 0.962 | 1.80738 | 47.26 |
| 17 | −121.46428 | 16.682 | | |
| 18 | 36.16521 | 3.266 | 2.00001 | 24.06 |
| 19 | 19.26489 | 6.005 | 1.49700 | 81.54 |
| 20 | −585.23930 | DD[20] | | |
| 21 | 59.19452 | 3.000 | 1.51600 | 64.38 |
| 22 | 376.25883 | 2.000 | | |
| 23 | ∞ | 1.000 | 1.51633 | 64.14 |
| 24 | ∞ | 14.238 | | |

TABLE 2

Example 1

| | Infinity | 200 mm |
|---|---|---|
| f | 35.018 | 35.942 |
| FNo. | 1.80 | 1.97 |
| 2ω (°) | 26.6 | 24.4 |
| DD[14] | 8.702 | 0.604 |
| DD[20] | 2.000 | 10.098 |

Figure 7:
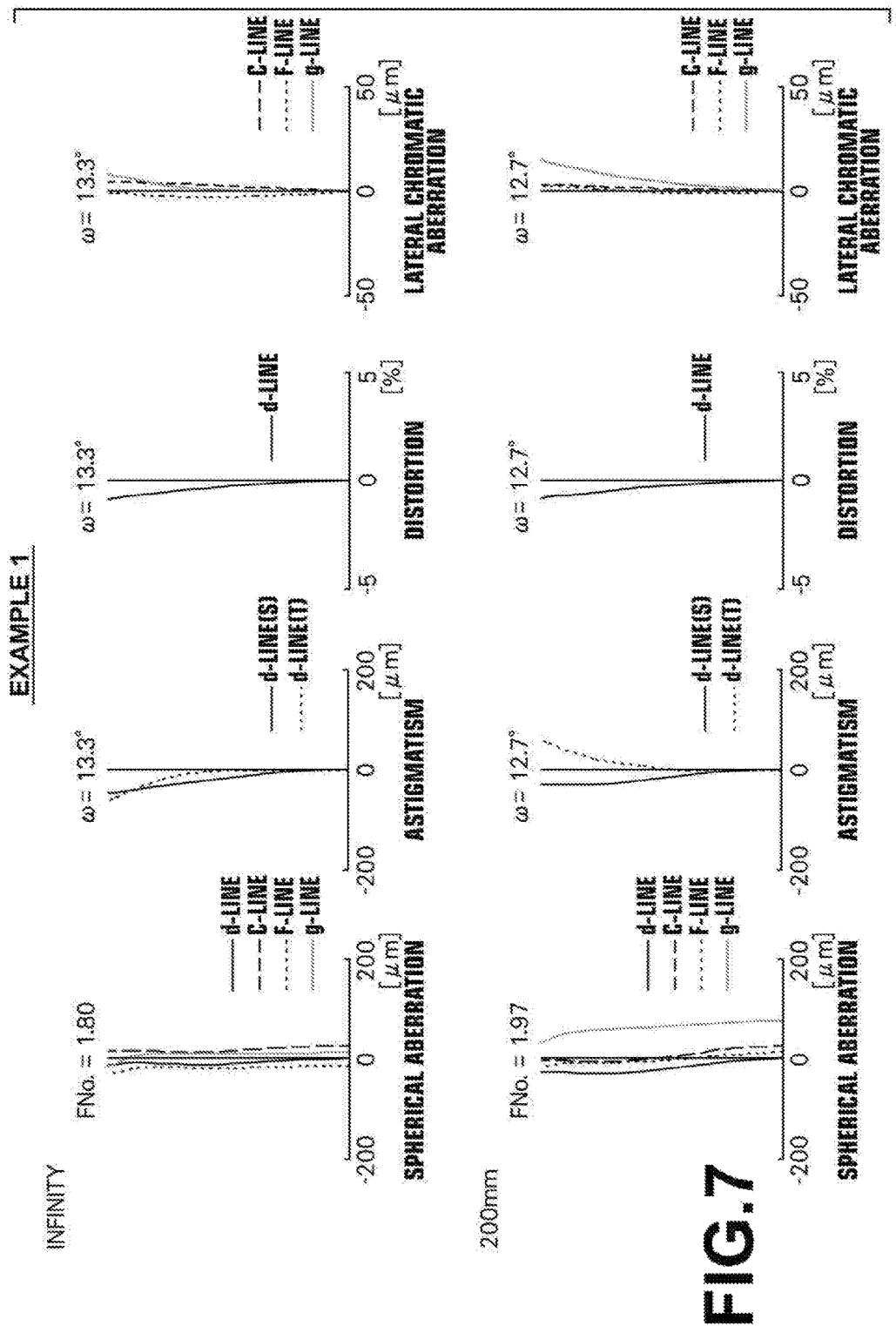
FIG. 7 shows aberration diagrams of the imaging lens of Example 1 of the disclosure, showing spherical aberration, astigmatism, distortion, and lateral chromatic aberration in this order from the left.

FIG. 7 shows aberration diagrams of the imaging lens of Example 1. The aberration diagrams shown at the top of FIG. 7 denoted by the text "INFINITY" are those of spherical aberration, astigmatism, distortion, and lateral chromatic aberration (magnification chromatic aberration), in this order from the left side, when the imaging lens is focused on an object at infinity. The aberration diagrams shown at the bottom of FIG. 7 denoted by the text "200 mm" are those of spherical aberration, distortion, and lateral chromatic aberration, in this order from the left side, when the imaging lens is focused on an object at an object distance of 200 mm. The aberration diagrams of spherical aberration show those with respect to the d-line (the wavelength of 587.6 nm), the C-line (the wavelength of 656.3 nm), the F-line (the wavelength of 486.1 nm), and the g-line (the wavelength of 435.8 nm) in the black solid line, the long dashed line, the short dashed line, and the gray solid line, respectively. The aberration diagrams of astigmatism show those with respect to the d-line in the sagittal direction and the tangential direction in the solid line and the short dashed line, respectively. The aberration diagrams of distortion show those with respect to the d-line in the solid line. The aberration diagrams of lateral chromatic aberration show those with respect to the C-line, the F-line, and the g-line in the long dashed line, the short dashed line, and the gray solid line, respectively. The symbol "FNo." in the aberration diagrams of spherical aberration means "F-number", and the symbol "ω" in the other aberration diagrams means "half angle of view".

The symbols, the meanings, and the manners of description of the data explained above with respect to Example 1 also apply to the other examples described below, unless otherwise noted, and the same explanations are not repeated below.

Example 2

Figure 2:
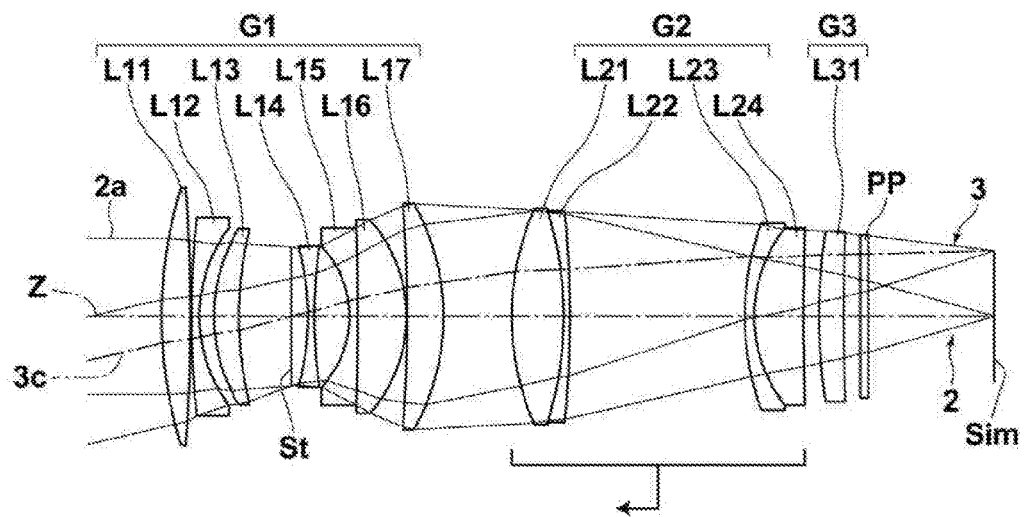
FIG. 2 is a sectional view illustrating the configuration of and optical paths through an imaging lens of Example 2 of the disclosure.
Figure 2:
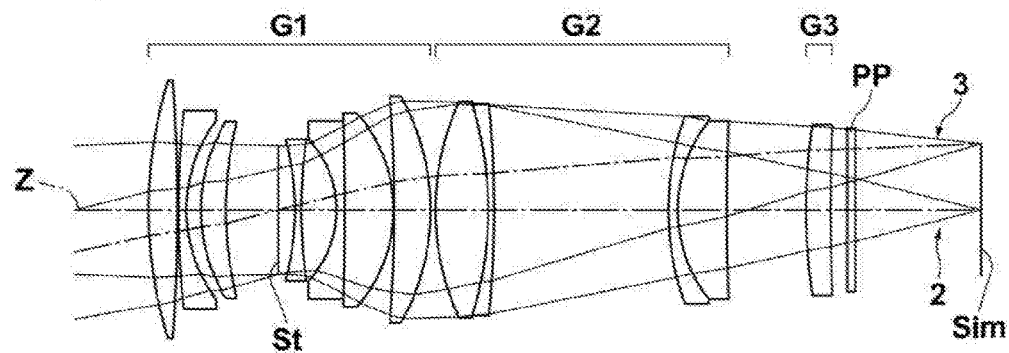
Figure 8:
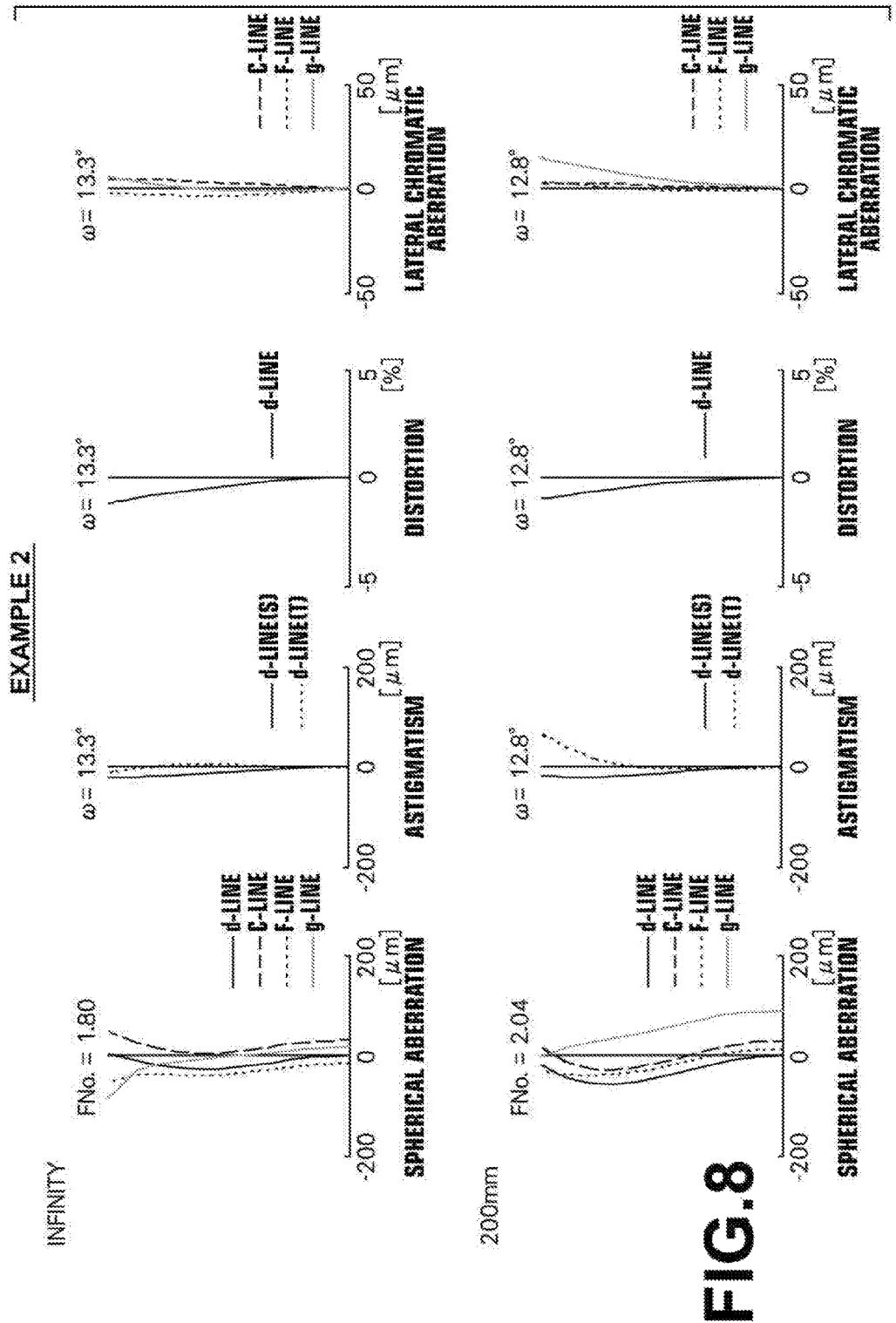
FIG. 8 shows aberration diagrams of the imaging lens of Example 2 of the disclosure, showing spherical aberration, astigmatism, distortion, and lateral chromatic aberration in this order from the left.

The lens configuration of the imaging lens of Example 2 is as shown in FIG. 2. In the imaging lens of Example 2, the first lens group G1 consists of seven lenses, i.e., lenses L11 to L17 in this order from the object side, the second lens group G2 consists of four lenses, i.e., lenses L21 to L24 in this order from the object side, and the third lens group G3 consists of one lens, i.e., a lens L31. An aperture stop St is disposed between the lens L13 and the lens L14. Table 3 shows basic lens data of the imaging lens of Example 2, Table 4 shows specifications and variable surface distances of the imaging lens, and FIG. 8 shows aberration diagrams of the imaging lens.

TABLE 3

Example 2

| Si | Ri | Di | Ndj | vdj |
|---|---|---|---|---|
| 1 | 55.65122 | 3.500 | 1.88300 | 40.76 |
| 2 | −232.07002 | 0.100 | | |
| 3 | 108.09062 | 1.000 | 1.84666 | 23.78 |
| 4 | 18.69234 | 1.776 | | |
| 5 | 21.04681 | 3.121 | 1.92286 | 18.90 |
| 6 | 45.25263 | 6.424 | | |
| 7(St) | ∞ | 2.019 | | |
| 8 | −32.83587 | 0.750 | 1.69895 | 30.13 |
| 9 | 60.03509 | 4.310 | | |
| 10 | −12.97209 | 1.000 | 1.92286 | 20.88 |
| 11 | −415.73288 | 5.958 | 1.74100 | 52.64 |
| 12 | −18.37525 | 0.100 | | |
| 13 | −174.08885 | 4.416 | 2.00272 | 19.32 |
| 14 | −29.05233 | DD[14] | | |
| 15 | 32.73181 | 6.449 | 1.49700 | 81.61 |
| 16 | −44.67042 | 0.750 | 1.88300 | 40.76 |
| 17 | −135.70383 | 21.346 | | |
| 18 | 34.77601 | 1.140 | 1.92119 | 23.96 |
| 19 | 18.03657 | 6.005 | 1.49700 | 81.54 |
| 20 | 335.43687 | DD[20] | | |
| 21 | 71.51078 | 3.000 | 1.51633 | 64.14 |
| 22 | 281.10027 | 2.000 | | |
| 23 | ∞ | 1.000 | 1.51633 | 64.14 |
| 24 | ∞ | 15.375 | | |

TABLE 4

Example 2

| | Infinity | 200 mm |
|---|---|---|
| f | 35.018 | 35.468 |
| FNo. | 1.80 | 2.04 |
| 2ω (°) | 26.6 | 24.6 |
| DD[14] | 8.339 | 0.602 |
| DD[20] | 2.000 | 9.737 |

Example 3

Figure 3:
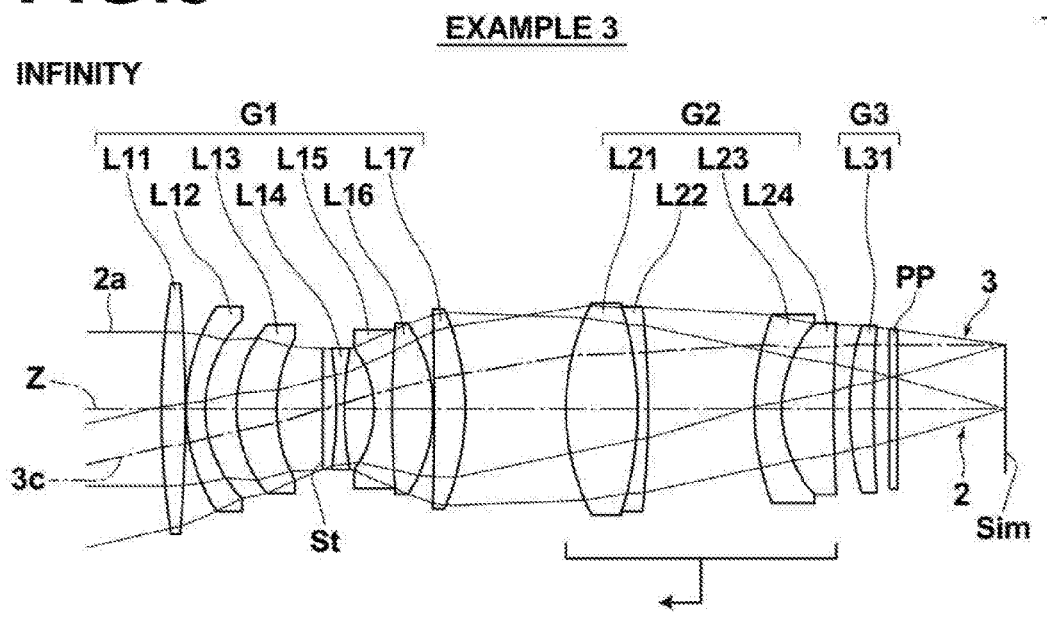
FIG. 3 is a sectional view illustrating the configuration of and optical paths through an imaging lens of Example 3 of the disclosure.
Figure 3:
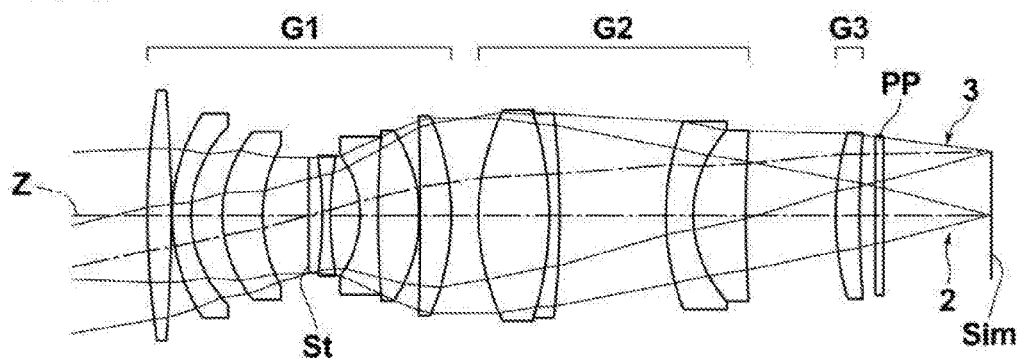
Figure 9:
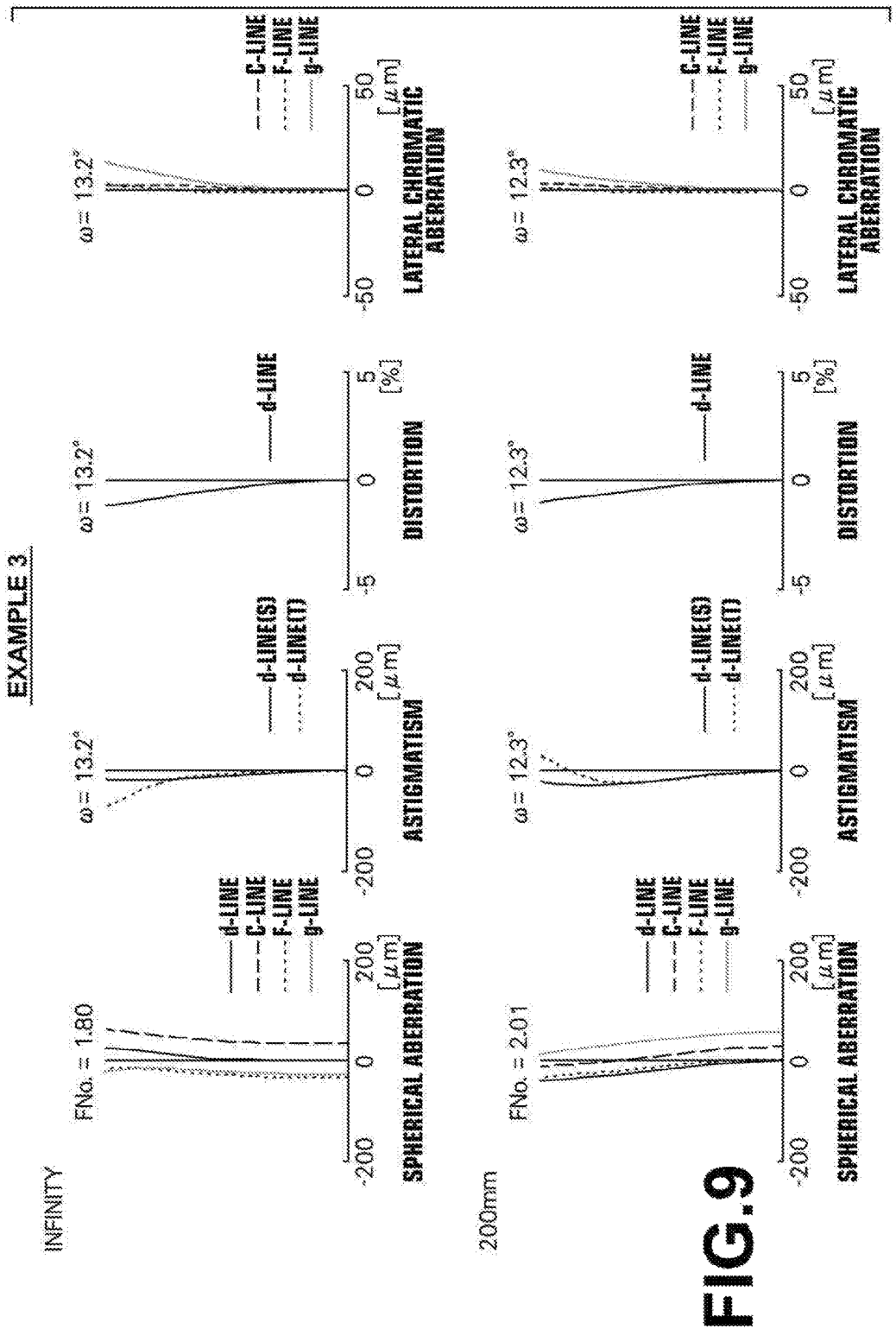
FIG. 9 shows aberration diagrams of the imaging lens of Example 3 of the disclosure, showing spherical aberration, astigmatism, distortion, and lateral chromatic aberration in this order from the left.

The lens configuration of the imaging lens of Example 3 is as shown in FIG. 3. In the imaging lens of Example 3, the first lens group G1 consists of seven lenses, i.e., lenses L11 to L17 in this order from the object side, the second lens group G2 consists of four lenses, i.e., lenses L21 to L24 in this order from the object side, and the third lens group G3 consists of one lens, i.e., a lens L31. An aperture stop St is disposed between the lens L13 and the lens L14. Table 5 shows basic lens data of the imaging lens of Example 3, Table 6 shows specifications and variable surface distances of the imaging lens, and FIG. 9 shows aberration diagrams of the imaging lens.

TABLE 5

Example 3

| Si | Ri | Di | Ndj | vdj |
|---|---|---|---|---|
| 1 | 109.00319 | 3.003 | 1.72916 | 54.68 |
| 2 | −188.02387 | 0.100 | | |
| 3 | 24.30372 | 2.368 | 1.80518 | 25.42 |
| 4 | 16.03980 | 4.032 | | |
| 5 | 17.06331 | 5.045 | 1.89286 | 20.36 |
| 6 | 18.97841 | 5.792 | | |
| 7(St) | ∞ | 1.714 | | |
| 8 | −49.87089 | 1.000 | 1.84666 | 23.78 |
| 9 | 42.83703 | 3.740 | | |
| 10 | −13.31238 | 2.246 | 1.84666 | 23.78 |
| 11 | 130.60979 | 5.193 | 1.75500 | 52.32 |
| 12 | −20.14849 | 0.100 | | |
| 13 | −577.07830 | 3.897 | 2.00272 | 19.32 |
| 14 | −32.43949 | DD[14] | | |
| 15 | 30.10260 | 8.999 | 1.49700 | 81.61 |
| 16 | −43.63697 | 1.320 | 1.91650 | 31.60 |
| 17 | −120.96430 | 13.368 | | |
| 18 | 33.87960 | 3.434 | 1.91650 | 31.60 |
| 19 | 16.41663 | 6.600 | 1.49700 | 81.54 |
| 20 | 180.00359 | DD[20] | | |
| 21 | 38.32929 | 3.000 | 1.51633 | 64.14 |
| 22 | 143.99584 | 2.000 | | |
| 23 | ∞ | 1.000 | 1.51633 | 64.14 |
| 24 | ∞ | 13.590 | | |

TABLE 6

Example 3

| | Infinity | 200 mm |
|---|---|---|
| f | 35.483 | 37.319 |
| FNo. | 1.80 | 2.01 |
| 2ω (°) | 26.4 | 23.6 |
| DD[14] | 12.789 | 3.433 |
| DD[20] | 2.000 | 11.356 |

Example 4

Figure 4:
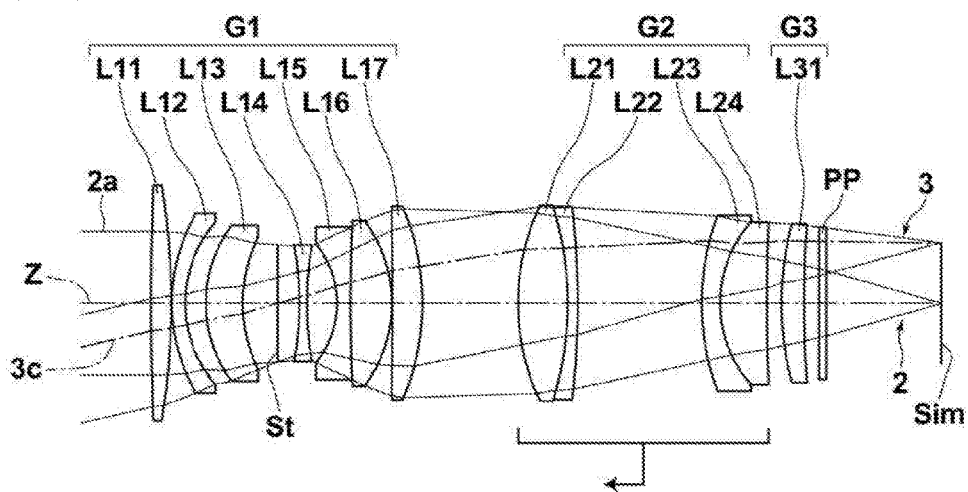
FIG. 4 is a sectional view illustrating the configuration of and optical paths through an imaging lens of Example 4 of the disclosure.
Figure 4:
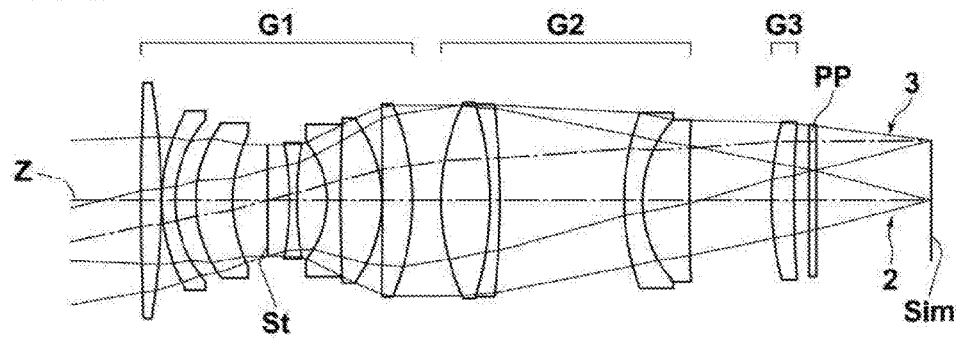
Figure 10:
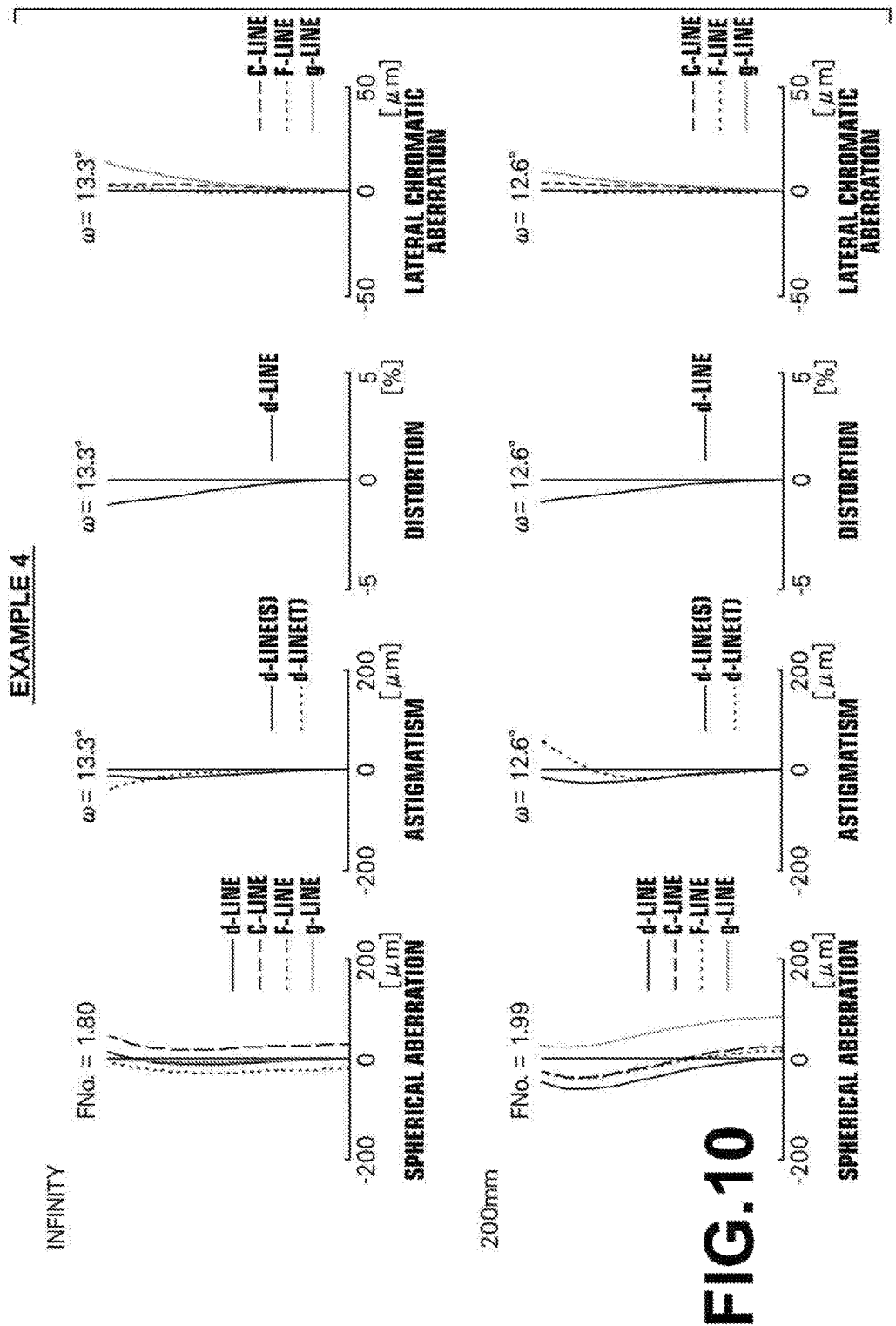
FIG. 10 shows aberration diagrams of the imaging lens of Example 4 of the disclosure, showing spherical aberration, astigmatism, distortion, and lateral chromatic aberration in this order from the left.

The lens configuration of the imaging lens of Example 4 is as shown in FIG. 4. In the imaging lens of Example 4, the first lens group G1 consists of seven lenses, i.e., lenses L11 to L17 in this order from the object side, the second lens group G2 consists of four lenses, i.e., lenses L21 to L24 in this order from the object side, and the third lens group G3 consists of one lens, i.e., a lens L31. An aperture stop St is disposed between the lens L13 and the lens L14. Table 7 shows basic lens data of the imaging lens of Example 4, Table 8 shows specifications and variable surface distances of the imaging lens, and FIG. 10 shows aberration diagrams of the imaging lens.

TABLE 7

Example 4

| Si | Ri | Di | Ndj | vdj |
|---|---|---|---|---|
| 1 | 400.53646 | 2.675 | 1.72916 | 54.68 |
| 2 | −102.34406 | 0.100 | | |
| 3 | 24.53190 | 1.800 | 1.80518 | 25.42 |
| 4 | 16.79657 | 2.813 | | |
| 5 | 17.97072 | 4.933 | 1.89286 | 20.36 |
| 6 | 20.80446 | 4.668 | | |
| 7(St) | ∞ | 2.885 | | |
| 8 | −43.14742 | 1.000 | 1.84666 | 23.78 |
| 9 | 47.19294 | 4.026 | | |
| 10 | −12.91769 | 1.786 | 1.84666 | 23.78 |
| 11 | 219.83066 | 5.518 | 1.75500 | 52.32 |
| 12 | −19.14539 | 0.100 | | |
| 13 | −892.12301 | 3.985 | 2.00272 | 19.32 |
| 14 | −33.95609 | DD[14] | | |
| 15 | 31.38914 | 6.637 | 1.49700 | 81.61 |
| 16 | −45.24738 | 1.320 | 1.91650 | 31.60 |
| 17 | −117.53862 | 16.580 | | |
| 18 | 34.91355 | 2.455 | 1.91650 | 31.60 |
| 19 | 16.88075 | 6.273 | 1.49700 | 81.54 |
| 20 | 307.01101 | DD[20] | | |
| 21 | 42.37804 | 3.000 | 1.51633 | 64.14 |
| 22 | 150.89050 | 2.000 | | |
| 23 | ∞ | 1.000 | 1.51633 | 64.14 |
| 24 | ∞ | 15.335 | | |

TABLE 8

Example 4

| | Infinity | 200 mm |
|---|---|---|
| f | 35.077 | 36.621 |
| FNo. | 1.80 | 1.99 |
| 2ω (°) | 26.6 | 24.2 |
| DD[14] | 12.883 | 3.847 |
| DD[20] | 2.000 | 11.036 |

Example 5

Figure 5:
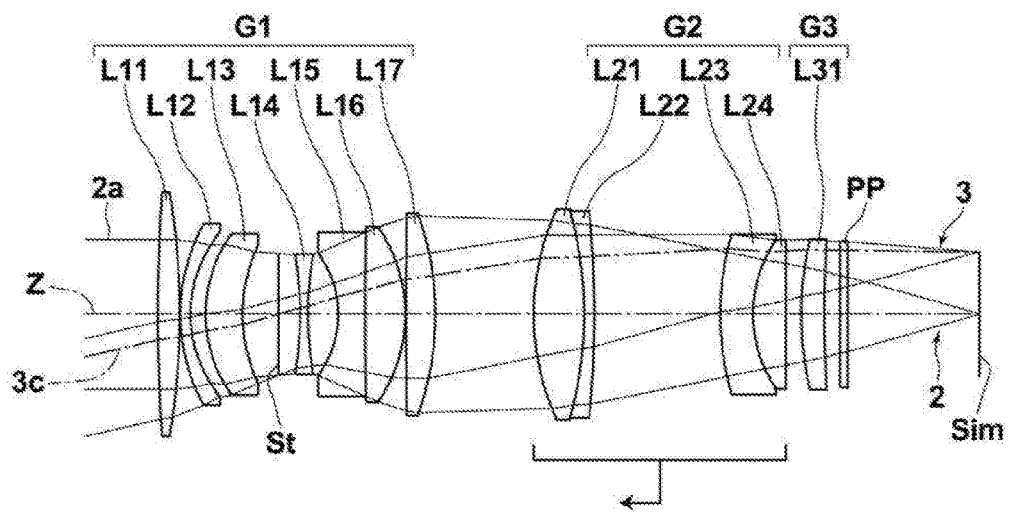
FIG. 5 is a sectional view illustrating the configuration of and optical paths through an imaging lens of Example 5 of the disclosure.
Figure 5:
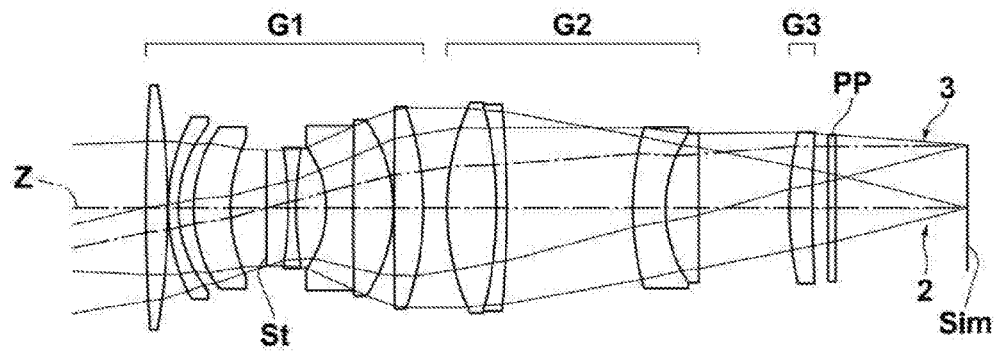
Figure 11:
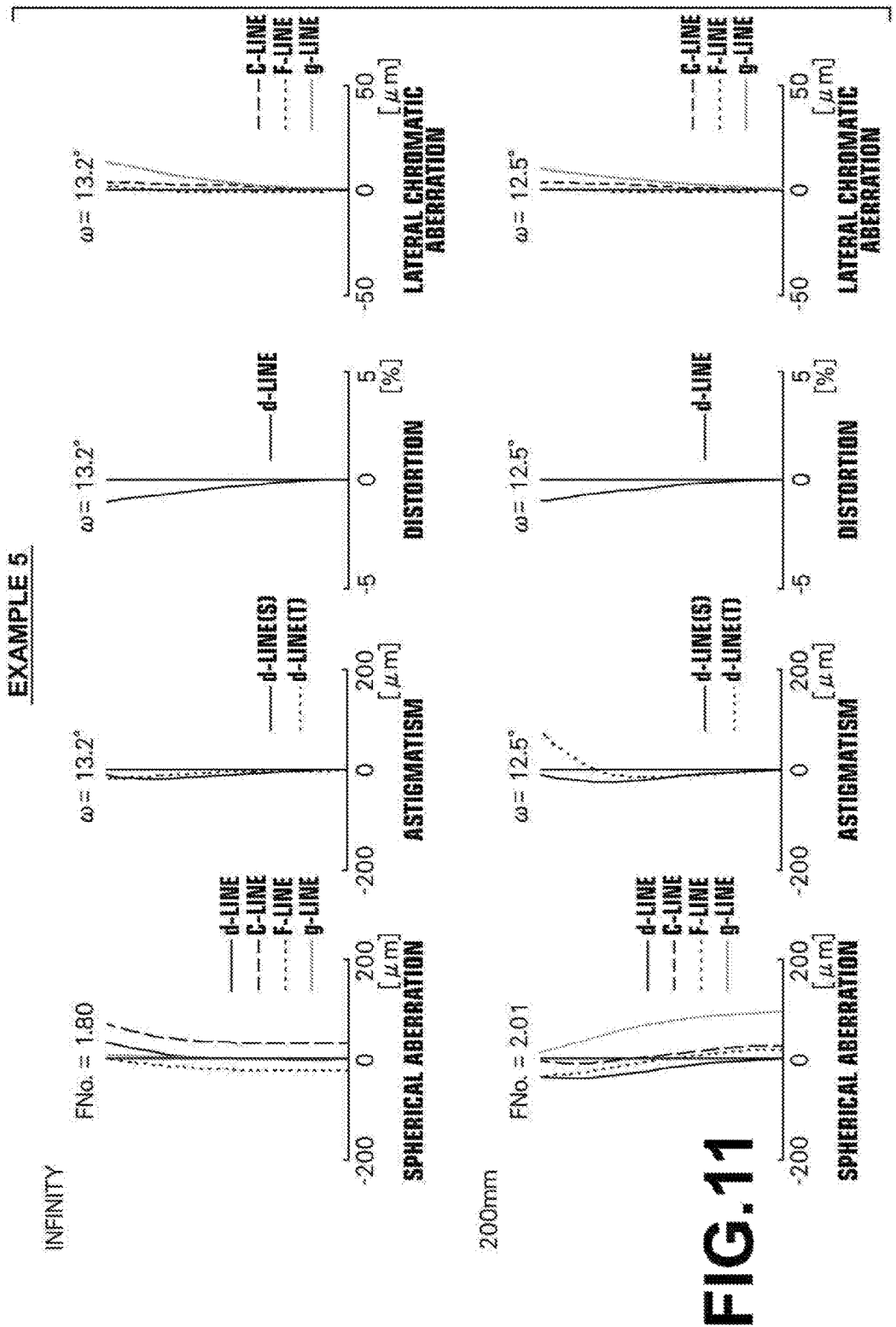
FIG. 11 shows aberration diagrams of the imaging lens of Example 5 of the disclosure, showing spherical aberration, astigmatism, distortion, and lateral chromatic aberration in this order from the left.

The lens configuration of the imaging lens of Example 5 is as shown in FIG. 5. In the imaging lens of Example 5, the first lens group G1 consists of seven lenses, i.e., lenses L11 to L17 in this order from the object side, the second lens group G2 consists of four lenses, i.e., lenses L21 to L24 in this order from the object side, and the third lens group G3 consists of one lens, i.e., a lens L31. An aperture stop St is disposed between the lens L13 and the lens L14. Table 9 shows basic lens data of the imaging lens of Example 5, Table 10 shows specifications and variable surface distances of the imaging lens, and FIG. 11 shows aberration diagrams of the imaging lens.

TABLE 9

Example 5

| Si | Ri | Di | Ndj | vdj |
|---|---|---|---|---|
| 1 | 249.62824 | 2.785 | 1.72916 | 54.68 |
| 2 | −100.14620 | 0.100 | | |
| 3 | 25.20170 | 1.292 | 1.80518 | 25.42 |
| 4 | 16.99554 | 1.966 | | |
| 5 | 18.06882 | 4.829 | 1.89286 | 20.36 |
| 6 | 21.77830 | 4.602 | | |
| 7(St) | ∞ | 2.798 | | |
| 8 | −45.26465 | 1.000 | 1.84666 | 23.78 |
| 9 | 44.98842 | 3.914 | | |
| 10 | −13.58404 | 3.441 | 1.84666 | 23.78 |
| 11 | 577.09873 | 5.179 | 1.75500 | 52.32 |
| 12 | −20.54517 | 0.100 | | |
| 13 | 1468.47875 | 3.773 | 2.00272 | 19.32 |
| 14 | −39.51329 | DD[14] | | |
| 15 | 33.48091 | 6.492 | 1.49700 | 81.61 |

TABLE 9-continued

Example 5

| Si | Ri | Di | Ndj | vdj |
|---|---|---|---|---|
| 16 | −51.47250 | 1.320 | 1.91650 | 31.60 |
| 17 | −139.54260 | 16.204 | | |
| 18 | 38.55227 | 4.214 | 1.91650 | 31.60 |
| 19 | 17.62355 | 4.276 | 1.49700 | 81.54 |
| 20 | −6211.85194 | DD[20] | | |
| 21 | 43.47944 | 3.000 | 1.51633 | 64.14 |
| 22 | 180.00952 | 2.000 | | |
| 23 | ∞ | 1.000 | 1.51633 | 64.14 |
| 24 | ∞ | 16.960 | | |

TABLE 10

Example 5

| | Infinity | 200 mm |
|---|---|---|
| f | 35.377 | 37.066 |
| FNo. | 1.80 | 2.01 |
| 2ω (°) | 26.4 | 23.4 |
| DD[14] | 12.762 | 3.043 |
| DD[20] | 2.000 | 11.719 |

Example 6

Figure 6:
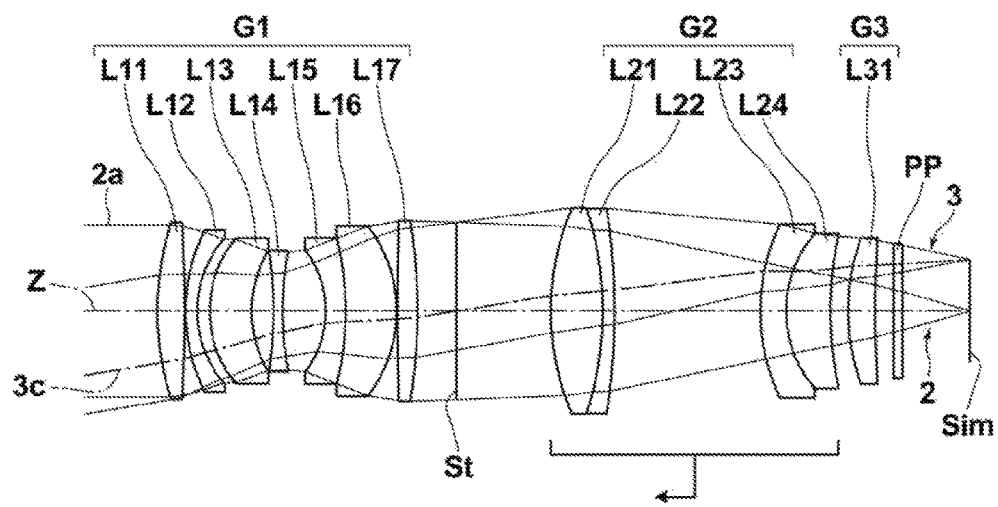
FIG. 6 is a sectional view illustrating the configuration of and optical paths through an imaging lens of Example 6 of the disclosure.
Figure 6:
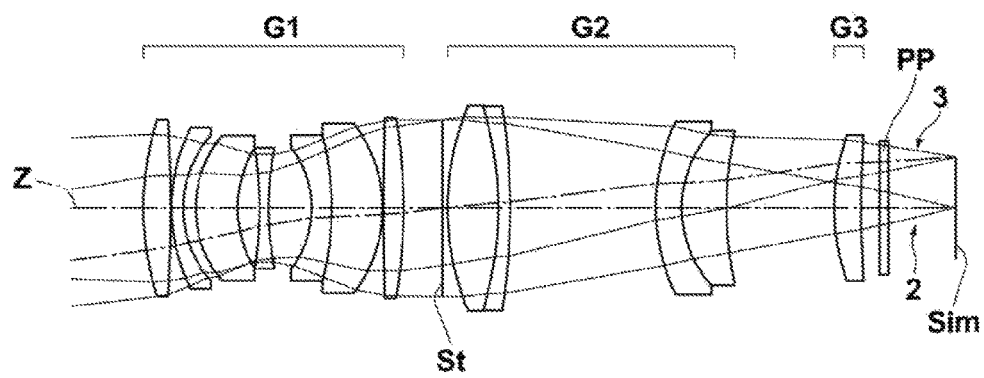
Figure 12:
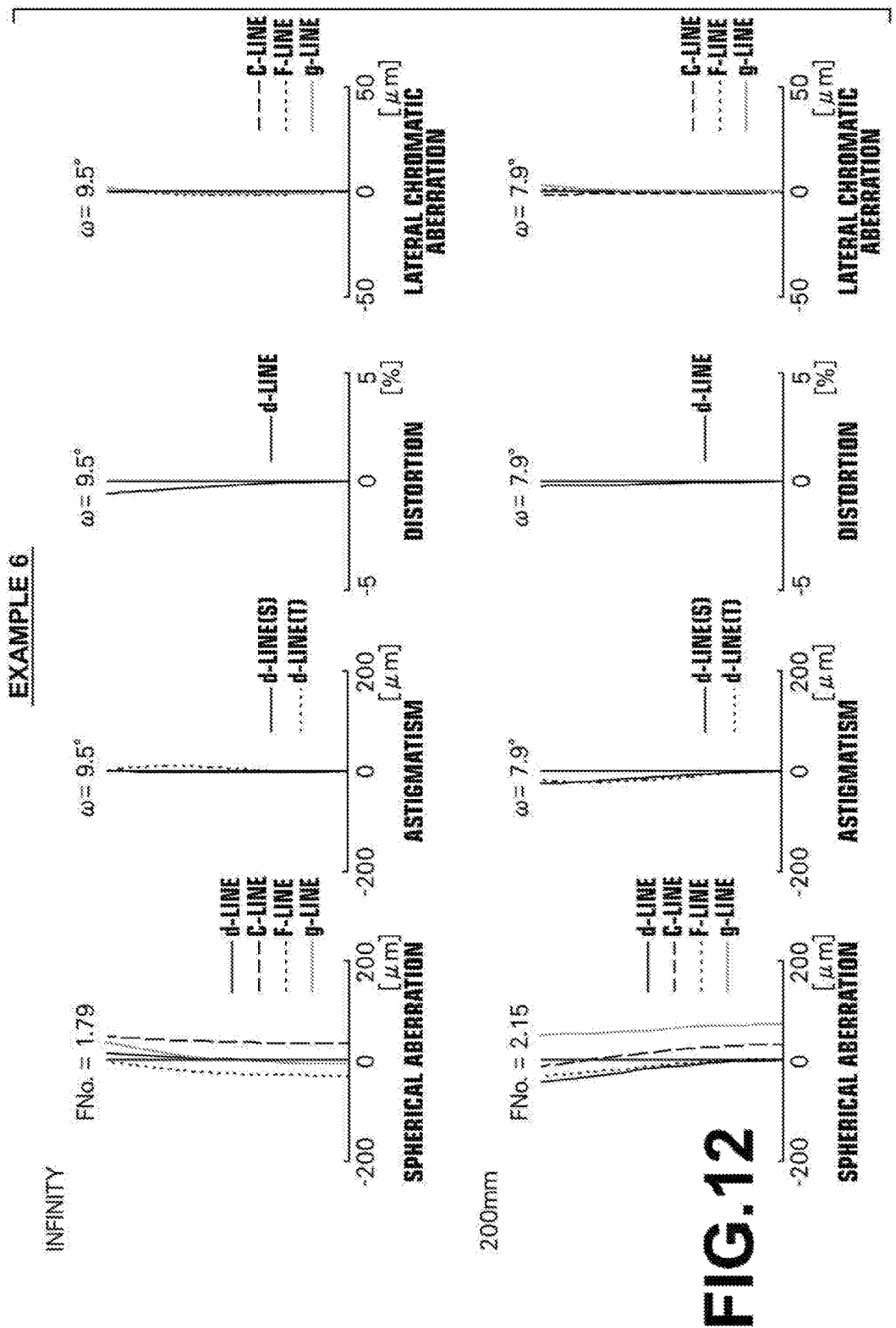
FIG. 12 shows aberration diagrams of the imaging lens of Example 6 of the disclosure, showing spherical aberration, astigmatism, distortion, and lateral chromatic aberration in this order from the left.

The lens configuration of the imaging lens of Example 6 is as shown in FIG. 6. In the imaging lens of Example 6, the first lens group G1 consists of seven lenses, i.e., lenses L11 to L17 in this order from the object side, the second lens group G2 consists of four lenses, i.e., lenses L21 to L24 in this order from the object side, and the third lens group G3 consists of one lens, i.e., a lens L31. An aperture stop St is disposed between the lens L17 and the lens L21, i.e., between the first lens group G1 and the second lens group G2. Table 11 shows basic lens data of the imaging lens of Example 6, Table 12 shows specifications and variable surface distances of the imaging lens, and FIG. 12 shows aberration diagrams of the imaging lens.

TABLE 11

Example 6

| Si | Ri | Di | Ndj | vdj |
|---|---|---|---|---|
| 1 | 33.71086 | 3.011 | 1.72916 | 54.68 |
| 2 | −178.68742 | 0.100 | | |
| 3 | 20.36708 | 1.299 | 1.80518 | 25.42 |
| 4 | 12.43284 | 1.405 | | |
| 5 | 12.75924 | 4.746 | 1.89286 | 20.36 |
| 6 | 13.62990 | 2.410 | | |
| 7 | −43.19334 | 1.000 | 1.84666 | 23.78 |
| 8 | 34.42592 | 4.812 | | |
| 9 | −11.47912 | 2.218 | 1.84666 | 23.78 |
| 10 | −34.33029 | 5.664 | 1.75500 | 52.32 |
| 11 | −16.03634 | 0.100 | | |
| 12 | 341.10278 | 2.220 | 2.00272 | 19.32 |
| 13 | −63.87690 | 4.349 | | |
| 14(St) | ∞ | DD[14] | | |
| 15 | 30.24931 | 5.760 | 1.49700 | 81.61 |
| 16 | −38.27610 | 1.320 | 1.91650 | 31.60 |
| 17 | −76.84832 | 16.210 | | |
| 18 | 23.06722 | 2.875 | 1.91650 | 31.60 |
| 19 | 13.26606 | 4.977 | 1.49700 | 81.54 |
| 20 | 40.41625 | DD[20] | | |
| 21 | 24.86707 | 3.000 | 1.51633 | 64.14 |
| 22 | 123.95097 | 2.000 | | |
| 23 | ∞ | 1.000 | 1.51633 | 64.14 |
| 24 | ∞ | 7.518 | | |

TABLE 12

Example 6

| | Infinity | 200 mm |
|---|---|---|
| f | 34.860 | 38.694 |
| FNo. | 1.79 | 2.15 |
| 2ω (°) | 19.0 | 16.6 |
| DD[14] | 10.590 | 0.535 |
| DD[20] | 2.000 | 12.055 |

Table 13 shows values relating to the condition expressions (1) to (4) and values corresponding to the condition expressions (5) to (12) of the imaging lenses of Examples 1 to 6. The values shown in Table 13 are with respect to the d-line.

TABLE 13

| Condition Expression | | | Example 1 | Example 2 | Example 3 | Example 4 | Example 5 | Example 6 |
|---|---|---|---|---|---|---|---|---|
| (1) | N21 | | 1.49700 | 1.49700 | 1.49700 | 1.49700 | 1.49700 | 1.49700 |
| (1) | N22 | | 1.80738 | 1.88300 | 1.91650 | 1.91650 | 1.91650 | 1.91650 |
| (2) | v21 | | 81.61 | 81.61 | 81.61 | 81.61 | 81.61 | 81.61 |
| (2) | v22 | | 47.26 | 40.76 | 31.60 | 31.60 | 31.60 | 31.60 |
| (3) | N23 | | 2.00001 | 1.92119 | 1.91650 | 1.91650 | 1.91650 | 1.91650 |
| (3) | N24 | | 1.49700 | 1.49700 | 1.49700 | 1.49700 | 1.49700 | 1.49700 |
| (4) | v23 | | 24.06 | 23.96 | 31.60 | 31.60 | 31.60 | 31.60 |
| (4) | v24 | | 81.54 | 81.54 | 81.54 | 81.54 | 81.54 | 81.54 |
| (5) | D/f | | 0.476 | 0.610 | 0.377 | 0.473 | 0.458 | 0.465 |
| (6) | f/f1 | | 0.160 | 0.186 | 0.144 | 0.133 | 0.135 | 0.144 |
| (7) | f/f2 | | 0.580 | 0.514 | 0.556 | 0.543 | 0.529 | 0.642 |
| (8) | β2 | | 0.186 | 0.209 | 0.178 | 0.163 | 0.169 | 0.183 |
| (9) | N22 − N21 | | 0.31038 | 0.386 | 0.4195 | 0.4195 | 0.4195 | 0.4195 |
| (11) | v21 − v22 | | 34.35 | 40.85 | 50.01 | 50.01 | 50.01 | 50.01 |
| (10) | N23 − N24 | | 0.50301 | 0.42419 | 0.4195 | 0.4195 | 0.4195 | 0.4195 |
| (12) | v24 − v23 | | 57.48 | 57.58 | 49.94 | 49.94 | 49.94 | 49.94 |

As can be seen from the data shown above, each of the imaging lenses of Examples 1 to 6 accomplishes an imaging lens that can achieve focusing without changing the entire length, has a wide focusing range covering from infinity to a close distance of around 5.7 times the focal length of the entire system, has suppressed changes of aberrations along with focusing, and has good optical performance.

Figure 13:
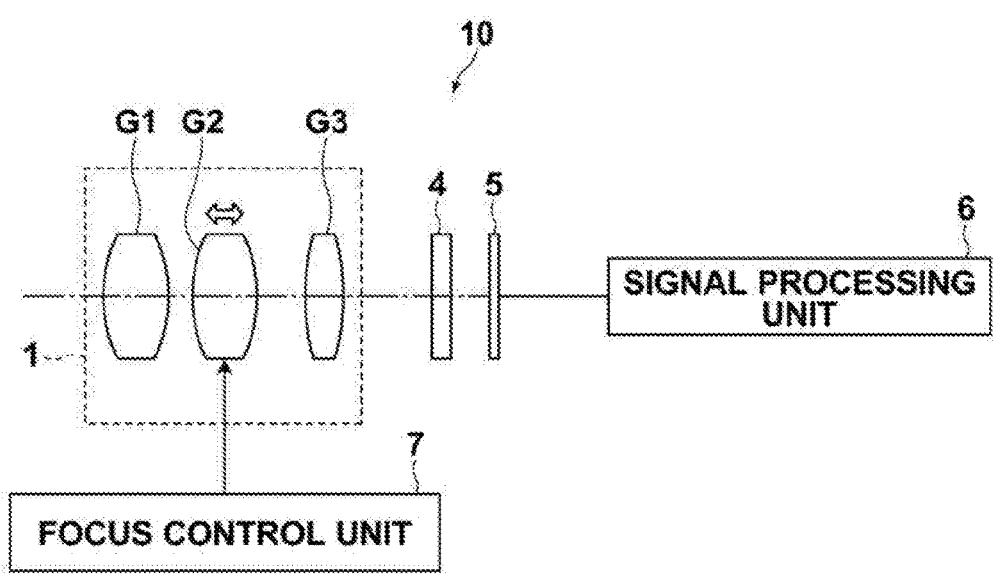
FIG. 13 is a diagram illustrating the schematic configuration of an imaging apparatus according to one embodiment of the disclosure.

Next, an imaging apparatus according to an embodiment of the disclosure is described. FIG. 13 shows the schematic configuration of an imaging apparatus 10 employing an imaging lens 1 according to an embodiment of the disclosure, as one example of the imaging apparatus according to an embodiment of the disclosure. Examples of the imaging apparatus 10 may include cameras used in the fields of FA and machine vision, and monitoring cameras.

The imaging apparatus 10 includes an imaging lens 1, a filter 4 disposed on the image side of the imaging lens 1, an image sensor 5, a signal processing unit 6 for processing signals outputted from the image sensor 5, and a focus control unit 7 for performing focusing of the imaging lens 1. In FIG. 13, the first lens group G1 and the second lens group G2 of the imaging lens 1 are shown in a conceptual manner. The image sensor 5 captures an image of the subject formed by the imaging lens 1 and converts the image into an electric signal, and the imaging plane of the image sensor 5 is positioned in the same position as the image plane of the imaging lens 1. As the image sensor 5, a CCD (Charge Coupled Device) or a CMOS (Complementary Metal Oxide Semiconductor), for example, may be used.

The present disclosure has been described with reference to the embodiments and the examples. However, the disclosure is not limited to the above-described embodiments and examples, and various modifications may be made to the disclosure. For example, the values of the radius of curvature, the surface distance, the refractive index, the Abbe number, etc., of each lens are not limited to the values shown in the above-described examples, and may be different values.

For example, while the lens systems of the above-described examples perform focusing from an object at infinity to a close object, the disclosure is also applicable to imaging lenses that perform focusing from a distant object at a finite distance to a close object.

Further, while cameras used in the fields of FA and machine vision and monitoring cameras are mentioned as examples in the above-described embodiment of the imaging apparatus, this is not intended to limit the disclosure, and the disclosure is also applicable to video cameras, digital cameras, film cameras, etc., as well as replaceable lenses for such cameras.

What is claimed is:

1. An imaging lens consisting of, in order from the object side, a first lens group that is fixed relative to an image plane during focusing, a second lens group that is moved as a whole from the image side toward the object side during focusing from a distant object to a close object and as a whole has a positive refractive power, and third lens group that is fixed relative to the image plane during focusing, wherein the second lens group consists of, in order from the object side, a first cemented lens consisting of, in order from the object side, a biconvex lens and a negative lens having a smaller absolute value of radius of curvature of the object-side surface than that of the image-side surface, and a second cemented lens as a whole having a positive refractive power and consisting of, in order from the object side, a negative lens having a smaller absolute value of radius of curvature of the image-side surface than that of the object-side surface and a positive lens having a smaller absolute value of radius of curvature of the object-side surface than that of the image-side surface, the third lens group consists of one positive lens, a stop that is fixed relative to the image plane during focusing is disposed at a position between the most object-side lens surface of the first lens group and the most object-side lens surface of the second lens group, and all the condition expressions (1) to (5) below are satisfied:

$$N21 < N22 \tag{1},$$

$$\nu 22 < \nu 21 \tag{2},$$

$$N24 < N23 \tag{3},$$

$$\nu 23 < \nu 24 \tag{4}, \text{ and}$$

$$0.2 < D/f < 0.8 \tag{5},$$

where N21 is a refractive index with respect to the d-line of the biconvex lens of the first cemented lens, N22 is a refractive index with respect to the d-line of the negative lens of the first cemented lens, N23 is a refractive index with respect to the d-line of the negative lens of the second cemented lens, N24 is a refractive index with respect to the d-line of the positive lens of the second cemented lens, $\nu 21$ is an Abbe number with respect to the d-line of the biconvex lens of the first cemented lens, $\nu 22$ is an Abbe number with respect to the d-line of the negative lens of the first cemented lens, $\nu 23$ is an Abbe number with respect to the d-line of the negative lens of the second cemented lens, $\nu 24$ is an Abbe number with respect to the d-line of the positive lens of the second cemented lens, D is an equivalent air distance along the optical axis between the first cemented lens and the second cemented lens, and f is a focal length of the entire system when the imaging lens is focused on an object at infinity.

2. The imaging lens as claimed in claim 1, wherein the first cemented lens as a whole has a positive refractive power.

3. The imaging lens as claimed in claim 1, wherein the first lens group as a whole has a positive refractive power.

4. The imaging lens as claimed in claim 1, wherein the condition expression (6) below is satisfied:

$$0 < f/f1 < 0.6 \tag{6},$$

where f1 is a focal length of the first lens group.

5. The imaging lens as claimed in claim 1, wherein the condition expression (7) below is satisfied:

$$0.4 < f/f2 < 0.8 \tag{7},$$

where f2 is a focal length of the second lens group.

6. The imaging lens as claimed in claim 1, wherein the condition expression (8) below is satisfied:

$$0 < \beta 2 < 0.6 \tag{8},$$

where $\beta 2$ is a lateral magnification of the second lens group when the imaging lens is focused on an object at infinity.

7. The imaging lens as claimed in claim 1, wherein the condition expression (9) below is satisfied:

$$0.25 < N22 - N21 < 0.6 \tag{9}.$$

8. The imaging lens as claimed in claim 1, wherein the condition expression (10) below is satisfied:

$$25 < \nu 21 - \nu 22 < 70 \tag{10}$$

9. The imaging lens as claimed in claim 1, wherein the condition expression (11) below is satisfied:

$$0.2 < N23 - N24 < 0.7 \tag{11}$$

10. The imaging lens as claimed in claim 1, wherein the condition expression (12) below is satisfied:

$$40 < \nu 24 - \nu 23 < 75 \tag{12}$$

11. The imaging lens as claimed in claim 1, wherein the first lens group includes, successively in order from the most object side, a single lens having a positive refractive power and a single lens having a negative refractive power.

12. The imaging lens as claimed in claim 1, wherein the first lens group includes, successively in order from the most image side, a positive lens, a positive lens, and a negative lens.

13. The imaging lens as claimed in claim 1, wherein the first lens group consists of seven lenses.

14. The imaging lens as claimed in claim 1, wherein the condition expression (5-1) below is satisfied:

$$0.25 < D/f < 0.7 \tag{5-1}$$

15. The imaging lens as claimed in claim 4, wherein the condition expression (6-1) below is satisfied:

$$0.12 < f/f1 < 0.5 \tag{6-1}$$

16. The imaging lens as claimed in claim 5, wherein the condition expression (7-1) below is satisfied:

$$0.45 < f/f2 < 0.7 \tag{7-1}$$

17. The imaging lens as claimed in claim 6, wherein the condition expression (8-1) below is satisfied:

$$0.15 < \beta 2 < 0.5 \tag{8-1}$$

18. An imaging apparatus comprising the imaging lens as claimed in claim 1.

* * * * *